United States Patent
Isshiki et al.

(10) Patent No.: US 12,242,644 B2
(45) Date of Patent: Mar. 4, 2025

(54) COLLATION SYSTEM, CLIENT TERMINAL, SERVER APPARATUS, COLLATION METHOD, AND PROGRAM

(71) Applicant: NEC Corporation, Tokyo (JP)

(72) Inventors: Toshiyuki Isshiki, Tokyo (JP); Hiroto Tamiya, Tokyo (JP); Masahiro Nara, Tokyo (JP); Toshihiko Okamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 296 days.

(21) Appl. No.: 17/925,664

(22) PCT Filed: May 29, 2020

(86) PCT No.: PCT/JP2020/021262
§ 371 (c)(1),
(2) Date: Nov. 16, 2022

(87) PCT Pub. No.: WO2021/240757
PCT Pub. Date: Dec. 2, 2021

(65) Prior Publication Data
US 2023/0342489 A1     Oct. 26, 2023

(51) Int. Cl.
*G06F 21/62* (2013.01)
*G06F 21/32* (2013.01)

(52) U.S. Cl.
CPC ......... *G06F 21/6245* (2013.01); *G06F 21/32* (2013.01); *G06F 2221/2103* (2013.01)

(58) Field of Classification Search
None
See application file for complete search history.

(56) References Cited

U.S. PATENT DOCUMENTS

2005/0222958 A1*  10/2005  Hasegawa ............. G07F 7/1008
                                                                      705/50
2012/0207299 A1    8/2012   Hattori et al.
(Continued)

FOREIGN PATENT DOCUMENTS

JP    2016-071639 A    5/2016
WO    2004/088591 A1   10/2004
(Continued)

OTHER PUBLICATIONS

International Search Report for PCT Application No. PCT/JP2020/021262, mailed on Sep. 24, 2020.
(Continued)

*Primary Examiner* — Brian Whipple
(74) *Attorney, Agent, or Firm* — Sughrue Mion, PLLC

(57) ABSTRACT

A collation system 10 includes divide registered information to first information and second information, and to provide the second information to a server apparatus 200, perform a first step for similarity calculation between the registered information and collation information inputted for collation with the registered information, based on the collation information and the first information, send a calculation result of the first step to the server apparatus 200, perform a second step for the similarity calculation based on the calculation result of the first step received from a client terminal 100, and the second information, send a calculation result of the second step to the client terminal 100, and perform a third step for the similarity calculation based on the calculation result of the second step received from the server apparatus 200, and the first information to calculate similarity between the registered information and the collation information.

11 Claims, 8 Drawing Sheets

(56) References Cited

U.S. PATENT DOCUMENTS

2018/0145825 A1 5/2018 Isshiki et al.
2019/0004790 A1* 1/2019 Choudhary ............. G06F 21/44
2022/0345302 A1* 10/2022 Fukuda ................... H04L 9/008

FOREIGN PATENT DOCUMENTS

WO 2011/052056 A1 5/2011
WO 2016/152130 A1 9/2016
WO 2016/203762 A1 12/2016

OTHER PUBLICATIONS

Minako Tada et al., "Privacy-Preserving Recommendation Schemes Using a Secure Function Evaluation Based on a Secret Sharing" Proceedings of the 2011 Symposium on Cryptography and Information Security, Jan. 25, 2011, IFI-3.

JP Office Action for JP Application No. 2024-007191, mailed on Sep. 10, 2024 with English Translation.

\* cited by examiner

| CLIENT 100: {x[i]} | SIZE | SERVER 200 |
|---|---|---|
| 1. CALCULATE $x_1[i]$, $x_2[i]$, $x_3[i]$ THAT SATISFY $x[i] = x_1[i] + x_2[i] \cdot x_3[i]$ | $\|p\| * d - bit$ 8Kbyte | |
| 2. STORE {($x_1[i]$, $x_2[i]$)}, AND PROVIDE {$x_3[i]$} TO SERVER | | |

Fig. 4

| CLIENT 100: $\{(x_1[i], x_2[i]), (y[i])\}$ | SIZE | SERVER 200: $\{x_3[i]\}, (g, h = g^{gk})$ |
|---|---|---|
| 1. SELECT $R \in Z_p$ AT RANDOM<br>2. SEND com = $(R \cdot x_2[i] \cdot y[i])$ | $\|p\| * d$ ~ bit<br>8Kbyte | |
| | $2(\|p\| + 1)$<br>~ bit<br>65byte | 1. CALCULATE sum = $\Sigma$com[i] · $x_3$[i]<br>2. SELECT r1 $\in$ Zp AT RANDOM<br>3. SEND chal1 = $g^{r1}$, chal2 = $g^{sum+r}$<br>(ENCRYPT 1 USING HOMOMORPHIC ENCRYPTION) |
| 3. CALCULATE sum1 = $\Sigma x_1[i] \cdot y[i]$<br>4. SEND resp1 = chal1$^R$, resp2 = $g^{sum1}$ · chal2$^{\frac{1}{R}}$<br>(CIPHERTEXT OF INNER PRODUCT) | $2(\|p\| + 1)$<br>~ bit<br>65byte | |
| | | 4. DETERMINE WHETHER resp2/(resp1)$^{\frac{1}{gk}}$ IS INCLUDED IN Dec range |

Fig. 5

| CLIENT 100: $\{(x_1[i], x_2[i])\}, \{y[i]\}$ | SIZE | SERVER 200: $\{x_3[i]\}, (g, h = g^{sk})$ |
|---|---|---|
| 1. SET $y[i] = y_1[i] \cdot y_2[i]$<br>2. SELECT $R_1, R_2 \xleftarrow{\$} \mathbb{Z}_p$ AT RANDOM<br>3. $com1 = R_1 \cdot x_2[i] \cdot y_1[i], com2 = R_2 \cdot x_3[i] \cdot y_2[i]$ | $2 * |p| * d$<br>$-bit$<br>16Kbyte | |
| | $4(|p| + 1)$<br>$-bit$<br>129byte | 1. $sum1 = \sum com1 \cdot x_3[i], sum2 = \sum com2 \cdot x_3[i]$<br>2. SELECT $r1 \in \mathbb{Z}_p$, AND $(c1, c12), (c21, c22)$<br>$= (g^{r1}, g^{sum1}h^{r}), (g^{r'1}, g^{sum2}h^{r'})$ |
| 4. $sum = \sum x_1[i] \cdot y[i]$<br>5. $(resp1, resp2) = (c11^{\frac{1}{R_1}} \cdot c21^{\frac{1}{R_2}}, g^{sum} \cdot c12^{\frac{1}{R_1}} \cdot c22^{\frac{1}{R_2}})$ | $2(|p| + 1)$<br>$-bit$<br>65byte | |
| | | 3. DETERMINE WHETHER $resp2 \cdot (resp1)^{\frac{1}{sk}}$ IS INCLUDED IN Dec_range |

Fig. 6

COLLATION SYSTEM, CLIENT TERMINAL, SERVER APPARATUS, COLLATION METHOD, AND PROGRAM

This application is a National Stage Entry of PCT/JP2020/021262 filed on May 29, 2020 the contents of all of which are incorporated herein by reference, in their entirety.

TECHNICAL FIELD

The present invention relates to a collation system, a client terminal, a server apparatus, a collation method, and a program.

BACKGROUND ART

An example of authentication is biometric authentication. The "biometric authentication" is a method of individual authentication, in which the biometric information of a registered person and the biometric information of a person to be authenticated are collated with each other to confirm whether or not the registered person and the person to are the same.

The "biometric information" is data extracted from some characteristics of an individual related to their body and behaviors, or data generated by converting the extracted data. The data may also be referred to as a feature.

A "template" is data stored on advance for biometric authentication, which includes data generated from the biometric information (hereinafter referred to as registered information) of a registered person.

When biometric authentication is performed in a client-server system, there is a mode of storing the template in a client terminal, and a mode of storing the template in a server apparatus. The client terminal is hereinafter also referred to as a client or a terminal. The server apparatus is also simply referred to as a server.

One example of the mode of storing the template in the client is fast identity online (FIDO). In FIDO, the template is stored on the client in advance. When biometric information of a user (person to be authenticated) who is currently using the client is input to the client, the client determines whether or not the person to be authenticated matches the registered person by using the input biometric information and the template. When the client determines that the person to be authenticated matches the registered person, the server determines whether or not a signature key (private key) owned by the client and a verification key (public key) owned by the server are keys that make a pair, based on a signature generated by the client using the signature key. In other words, in FIDO, when biometric authentication succeeds in the client and verification of the signature of the client succeeds in the server, finally, it is determined that authentication of the user (person to be authenticated) has succeeded.

In FIDO, data including information, which is obtained by encrypting biometric information of the registered person, is stored on the client as the template in advance. A key for decrypting the encrypted information is also stored on the client. When the biometric information of the person to be authenticated is input to the client, the client decrypts the ciphertext of the biometric information included in the template by using the key, and determines whether or not the person to be authenticated matches the registered person by using the decrypted biometric information and the input biometric information.

Encrypted biometric information is in some cases stored on an integrated circuit (IC) chip of a cash card.

Here, what is protected as personal information under the "Act on the Protection of Personal Information (hereinafter referred to as the Personal Information Protection Act)" in Japan will be described. The Personal Information Protection Act in Japan stipulates that biometric information, being information with which an individual can be identified, falls under personal information. In addition, the Personal Information Protection Act stipulates that personal information managed in an electronic database or a paper-based database is protected under the Personal Information Protection Act.

It can be said that, in the mode of storing the template in the server, templates of individual users using individual clients are stored on a common server as a database. Hence, the templates stored on the server are protected under the Personal Information Protection Act.

An administrator of a server is required to protect the server so that the templates do not leak. In other words, greater security costs are incurred as further protection is provided for the server.

In contrast, in the mode of storing the template in the client, the client stores templates of a single or a small number of users who use the client. Thus, it cannot be said that the templates are stored as a database. Hence, the templates stored on the client may not be protected under the Personal Information Protection Act.

PTLs 1 to 3 disclose use of homomorphic encryption that allows operation of biometric information or the like as it is encrypted in a biometric authentication system.

CITATION LIST

Patent Literature

[PTL 1] WO 2016/203762
[PTL 2] WO 2016/152130
[PTL 3] WO 2011/052056

SUMMARY

Technical Problem

Even when the templates are stored on the client, it is preferable that leakage of registered information of users from the client be prevented. Prevention of identity theft by a third party and reduction of calculation costs for collating registered information of a registered person and collation information of a person to be authenticated have been required.

In view of this, the present invention has an example object to provide a collation system, a client terminal, a server apparatus, a collation method, and a program that can prevent leakage of registered information and identity theft and can reduce calculation costs for collating registered information of a registered person and collation information of a person to be authenticated.

Solution to Problem

A collation system according to an example aspect of the present disclosure includes a client terminal and a server apparatus, the collation system including a secret sharing processing unit in the client terminal configured to divide registered information to first information and second information, and to provide the second information to the server apparatus; a first similarity calculating unit in the client terminal configured to perform a first step for similarity calculation between the registered information and collation information inputted for collation with the registered information, based on the collation information and the first information; a first sending unit in the client terminal configured to send a calculation result of the first step to the server apparatus; a second similarity calculating unit in the server apparatus configured to perform a second step for the similarity calculation based on the calculation result of the first step received from the client terminal, and the second information; a second sending unit in the server apparatus configured to send a calculation result of the second step to the client terminal; and a third similarity calculating unit in the client terminal configured to perform a third step for the similarity calculation based on the calculation result of the second step received from the server apparatus, and the first information to calculate similarity between the registered information and the collation information.

A client terminal according to an example aspect of the present disclosure includes a secret sharing processing unit configured to divide registered information to first information and second information, to store the first information, and to provide the second information to a server apparatus; a first similarity calculating unit configured to perform a first step for similarity calculation between the registered information and collation information inputted for collation with the registered information, based on the collation information and the first information; a sending unit configured to send a calculation result of the first step to the server apparatus; and a third similarity calculating unit configured to perform a third step for the similarity calculation based on a calculation result of a second step for the similarity calculation based on a calculation result of the first step received from the server apparatus and the second information, and the first information to calculate similarity between the registered information and the collation information.

A server apparatus according to an example aspect of the present disclosure includes a second similarity calculating unit configured to receive, from a client terminal, a calculation result of a first step for similarity calculation between first information divided from registered information and collation information inputted for collation with the registered information, and to perform a second step for the similarity calculation based on the calculation result of the first step and second information divided from the registered information; and a sending unit configure to send, to the client terminal, a calculation result of the second step for the client terminal to perform a third step for the similarity calculation based on the calculation result of the second step and the first information.

A collation method in a collation system including a client terminal and a server apparatus, the collation method according to an example aspect of the present disclosure includes dividing, by the client terminal, registered information to first information and second information; providing, by the client terminal, the second information to the server apparatus; performing, by the client terminal, a first step for similarity calculation between the registered information and collation information inputted for collation with the registered information, based on the collation information and the first information; sending, by the client terminal, a calculation result of the first step to the server apparatus; performing, by the server apparatus, a second step for the similarity calculation based on the calculation result of the first step received from the client terminal, and the second information; sending, by the server apparatus, a calculation result of the second step to the client terminal; and performing, by the client terminal, a third step for the similarity calculation based on the calculation result of the second step received from the server apparatus, and the first information to calculate similarity between the registered information and the collation information.

A program for a client terminal causing a computer according to an example aspect of the present disclosure includes a secret sharing process of dividing registered information to first information and second information, storing the first information, and providing the second information to a server apparatus; a first similarity calculating process of performing a first step for similarity calculation between the registered information and collation information inputted for collation with the registered information, based on the collation information and the first information; a sending process of sending a calculation result of the first step to the server apparatus; and a third similarity calculating process of performing a third step for the similarity calculation based on a calculation result of a second step for the similarity calculation based on a calculation result of the first step received from the server apparatus and the second information, and the first information to calculate similarity between the registered information and the collation information.

A program for a server apparatus causing a computer according to an example aspect of the present disclosure includes a second similarity calculating process of receiving, from a client terminal, a calculation result of a first step for similarity calculation between first information divided from registered information and collation information inputted for collation with the registered information, and performing a second step for the similarity calculation based on the calculation result of the first step and second information divided from the registered information; and a sending process of sending, to the client terminal, a calculation result of the second step for the client terminal to perform a third step for the similarity calculation based on the calculation result of the second step and the first information.

Advantageous Effects of Invention

According to the present invention, it is possible to prevent leakage of registered information and identity theft and can reduce calculation costs for collating registered information of a registered person and collation information of a person to be authenticated.

BRIEF DESCRIPTION OF THE DRAWINGS

FIG. 4 is an explanatory diagram illustrating a specific example of the registration processing according to the first example embodiment;

FIG. 5 is an explanatory diagram illustrating a specific example of the authentication processing according to the first example embodiment;

FIG. 6 is an explanatory diagram illustrating another specific example of the authentication processing according to the first example embodiment;

DESCRIPTION OF THE EXAMPLE EMBODIMENTS

Each example embodiment of the present invention will be described below with reference to the drawings. Note that, in the Specification and drawings, elements to which similar descriptions are applicable are denoted by the same reference signs, and overlapping descriptions may hence be omitted. The following description will be given by taking an example of a case in which a collation system according to the present invention is applied to biometric authentication. Note that the collation system according to the present invention may be applied to authentication other than biometric authentication. A client 100 and a client 800 to be described later are each a client terminal, and a server 200 and a server 900 to be described later are each a server apparatus.

Descriptions will be given in the following order.
1. First Example Embodiment
   1.1. System Configuration
   1.2. Registration Phase
   1.3. Authentication Phase
   1.4. Specific Example 1
   1.5. Specific Example 2
   1.6. Hardware Configuration
   1.7. Description of Effects
2. Second Example Embodiment
   2.1. System Configuration
   2.2. Registration Phase
   2.3. Authentication Phase
   2.4. Description of Effects
3. Other Example Embodiments
4. Supplementary Notes

1. First Example Embodiment

1.1. System Configuration

Figure 1:
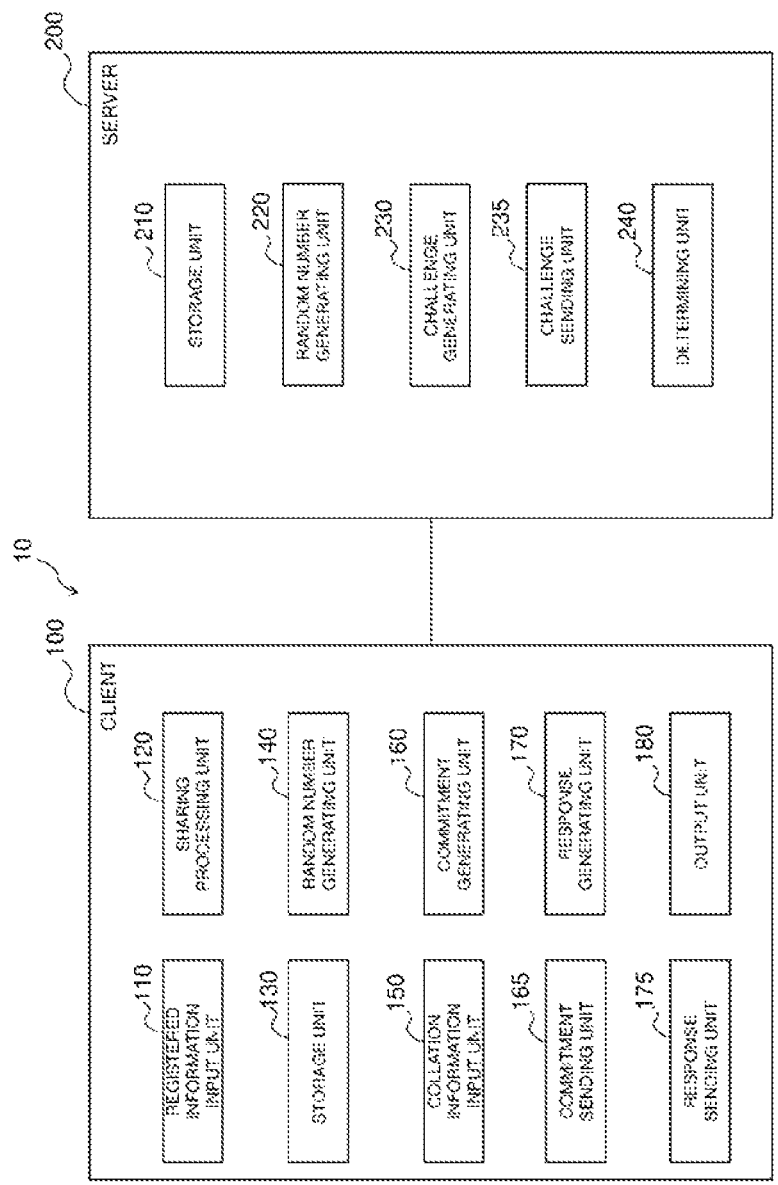
FIG. 1 is a block diagram illustrating a configuration example of a collation system according to a first example embodiment.

FIG. 1 is a block diagram illustrating a configuration example of a collation system according to a first example embodiment. A collation system 10 illustrated in FIG. 1 includes a client 100 and a server 200. Note that, although a single client 100 is illustrated in FIG. 1, a plurality of clients 100 may be present. The client 100 and the server 200 can communicate with each other via a communication network.

A challenge-response method is introduced to the collation system 10 according to the present example embodiment so as to prevent identity theft. Specifically, the server 200 sends a different challenge each time, i.e., for each authentication to the client 100 each time, and the client 100 calculates a response corresponding to the challenge, in such a manner that a value of the response is changed for each authentication.

Even if an attacker wiretaps the value of the response, the wiretapped value of the response can no longer be used in the next authentication, and the attacker cannot generate a response corresponding to another challenge. Therefore, identity theft such as retransmission attack is prevented.

Each constituent element of the collation system 10 according to the present example embodiment will be described below.

As illustrated in FIG. 1, the client 100 includes a registered information input unit 110, a sharing processing unit 120, a storage unit 130, a random number generating unit 140, a collation information input unit 150, a commitment generating unit 160, a commitment sending unit 165, a response generating unit 170, a response sending unit 175, and an output unit 180.

The registered information input unit 110 receives input of registered information. In the present example embodiment, as the registered information, biometric information of a registered person is input to the registered information input unit 110.

Note that, in the present example embodiment, description will be given by taking an example of a case in which the registered information and collation information to be described later (information input for collation with the registered information) are represented as vectors of common dimensions as features.

The registered information input unit 110 may be any input device depending on the registered information. For example, when biometric information extracted from a fingerprint is used as the registered information, the registered information input unit 110 may be an input device that reads a fingerprint, extracts a vector used as the registered information from the fingerprint, and receives the vector as input. The registered information input unit 110 may be an input device into which the vector used as the registered information is directly input.

Note that, in the present example embodiment, the biometric information may be extracted from an iris, a retina, a face, a blood vessel (vein), a palm print, a voiceprint, or a combination of these, other than a fingerprint. The biometric information may be extracted from other information with which a living body can be identified, other than the examples described above.

A vector corresponding to the biometric information (registered information) of a registered person input to the registered information input unit 110 is represented by x.

The sharing processing unit 120 performs secret sharing of the biometric information x of the registered person input to the registered information input unit 110. For secret sharing, for example, 2-out-of-2 linear secret sharing may be used. Specifically, the sharing processing unit 120 divides the biometric information x, and inputs a part of information (in other words, first information) to the storage unit 130 as a template. The sharing processing unit 120 provides another part of information (in other words, second information) divided from the biometric information x to the server 200 as a verification key. These pieces of information are encrypted and concealed.

The information input for collation with the registered information is referred to as collation information. The collation information input unit 150 receives input of the collation information. In the present example embodiment, as the collation information, biometric information of a person to be authenticated is input to the collation information input unit 150. As described above, the registered information and the collation information are represented by vectors of common dimensions as features.

The collation information input unit 150 may be any input device depending on the collation information. For example, when biometric information extracted from a fingerprint is used as the collation information, the collation information input unit 150 may be an input device that reads a fingerprint, extracts a vector used as the collation information from the fingerprint, and receives the vector as input. The collation information input unit 150 may be an input device into which the vector used as the collation information is directly input. The registered information input unit 110 and the collation information input unit 150 may be a common input device.

A vector corresponding to the biometric information (collation information) of a person to be authenticated input to the collation information input unit 150 is represented by y.

The random number generating unit 140 generates a random number R. The random number generating unit 140 inputs the generated random number R to the storage unit 130.

The commitment generating unit 160 uses the random number R stored on the storage unit 130, a part of the template, and the biometric information y of the person to be authenticated to generate a commitment. The commitment sending unit 165 executes sending processing of sending the generated commitment to the server 200.

The response generating unit 170 uses the challenge received from the server 200, another part of the template, and the biometric information y of the person to be authenticated to generate a response. The response generating unit 170 can use encrypted information in information used for response generation without decrypting. The response sending unit 175 executes sending processing of sending the generated response to the server 200.

The output unit 180 receives determination results for the response from the server 200, and outputs the determination results. The determination results indicate authentication results as to whether or not the registered person and the person to be authenticated match.

The sharing processing unit 120, the commitment generating unit 160, the commitment sending unit 165, the response generating unit 170, the response sending unit 175, and the output unit 180 are, for example, implemented by a central processing unit (CPU) of a computer that operates in accordance with a program for the client terminal and a communication interface of the computer. For example, the CPU may read a program for the client terminal from a program recording medium of the computer, such as a program storage apparatus, and operate as the sharing processing unit 120, the random number generating unit 140, the commitment generating unit 160, the commitment sending unit 165, the response generating unit 170, the response sending unit 175, and the output unit 180 with the use of the communication interface in accordance with the program. The random number generating unit 140 is, for example, implemented by a CPU of a computer that operates in accordance with a program for the client terminal. For example, as described above, the CPU may read a program for the client terminal from a program recording medium, and operate as the random number generating unit 140 in accordance with the program.

The storage unit 130 is, for example, implemented by a storage apparatus included in the computer.

As illustrated in FIG. 1, the server 200 includes a storage unit 210, a random number generating unit 220, a challenge generating unit 230, a challenge sending unit 235, and a determining unit 240.

The storage unit 210 receives a part of the biometric information x of the registered person received from the client 100, and stores the received part of the biometric information x as a verification key. The storage unit 210 can also store a random number r1 to be described later and range information used for determining processing.

The random number generating unit 220 generates the random number r1. The random number generating unit 220 inputs the generated random number r1 to the storage unit 210. As will be described later, the random number r1 is used for generation of a challenge to be sent to the client 100 and the like.

The challenge generating unit 230 uses the commitment received from the client 100 and the part of the biometric information x stored on the storage unit 210 as the verification key to generate a challenge. The challenge sending unit 235 executes sending processing of sending the generated challenge to the client 100.

The determining unit 240 determines whether a value of the response received from the client 100 is included within a predetermined range. The range information related to the value of the response may be acquired from the storage unit 210.

Specifically, the determining unit 240 determines whether or not the value of the response is a value within a range determined in advance, and thereby determines whether or not the collation information and the registered information correspond to each other. In other words, the determining unit 240 determines whether or not the registered person and the person to be authenticated match.

When the value of the response is the value within the range determined in advance, the determining unit 240 determines that the collation information and the registered information correspond to each other. In other words, the determining unit 240 determines that the registered person and the person to be authenticated match (authentication successful). When the value of the response is not the value within the range determined in advance, the determining unit 240 determines that the collation information and the registered information do not correspond to each other. In other words, the determining unit 240 determines that the registered person and the person to be authenticated do not match (authentication failed). The determining unit 240 sends information indicating the determination results to the client 100.

When the registered person and the person to be authenticated match, it may be considered that the authentication proceeded successfully, and post-authentication processing may be executed. For example, as an example, when the server 200 sends determination results of the determining unit 240 to the client 100 and the client 100 receives the determination results indicating that the registered person and the person to be authenticated match, it may be considered that the authentication proceeded successfully, and post-authentication processing may be executed. Note that an apparatus that executes the post-authentication processing is not limited to the client 100, and an apparatus other than the client 100 may execute the post-authentication processing, on the condition that the apparatus has obtained the determination results that the registered person and the person to be authenticated match.

The challenge generating unit 230, the challenge sending unit 235, and the determining unit 240 are, for example, implemented by a CPU of a computer that operates in accordance with a program for the server apparatus and a communication interface of the computer. For example, the CPU may read the program for the server apparatus from a program recording medium of the computer, such as a program storage apparatus, and operate as the challenge generating unit 230, the challenge sending unit 235, and the determining unit 240 with the use of the communication interface in accordance with the program. The random number generating unit 220 is, for example, implemented by the CPU of the computer that operates in accordance with a program for the server apparatus. For example, the CPU may read the program for the server apparatus from the program recording medium as described above, and operate as the random number generating unit 220 in accordance with the program.

The storage unit 210 is, for example, implemented by a storage apparatus included in the computer.

Next, a flow of processing in a registration phase for the biometric information x and a flow of processing in an authentication phase for the biometric information y in a collation method according to the present example embodiment will be described.

1.2. Registration Phase

Figure 2:
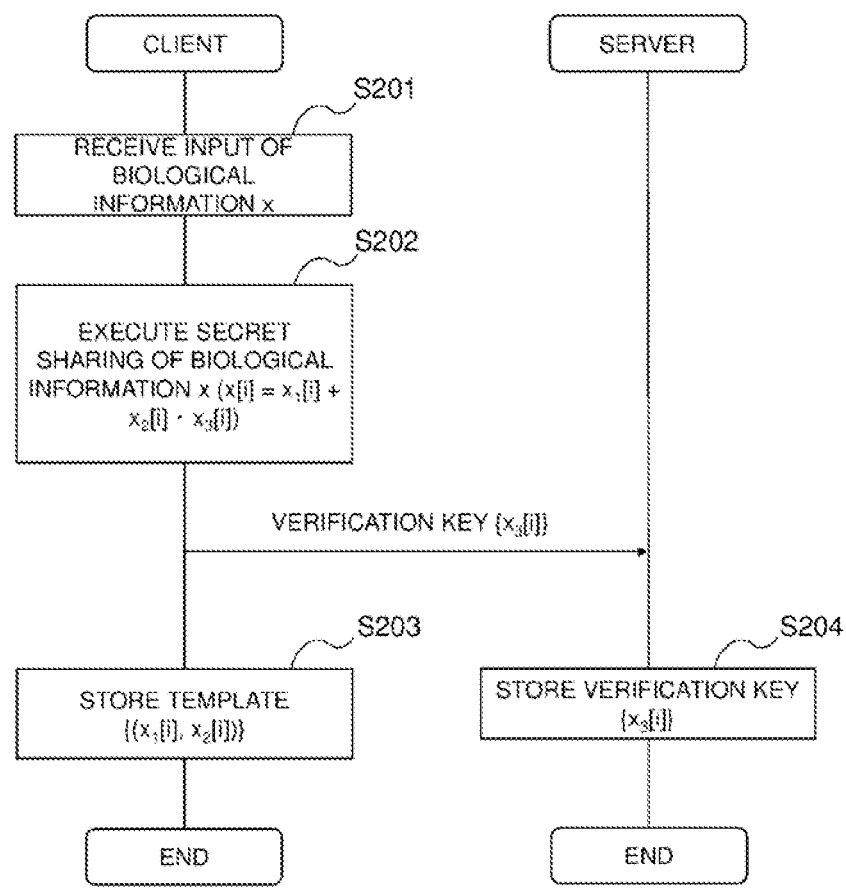
FIG. 2 is a flowchart illustrating an example of a flow of registration processing according to the first example embodiment.

FIG. 2 is a flowchart illustrating an example of a flow of registration processing according to the first example embodiment. In the registration processing, input biometric information is secret-shared into a template and a verification key, the template is stored on the client 100, and the verification key is stored on the server. Note that a detailed description of what has already been described will be omitted.

First, in Step S201, the registered information input unit 110 of the client 100 receives input of the biometric information x=(x[1], x[2], . . . , x[n]) of the registered person.

Next, in Step S202, the sharing processing unit 120 executes secret sharing of the input biometric information x. A part of information (in other words, first information) divided from the biometric information x is used as the template, and another part of information (in other words, second information) divided from the biometric information x is used as the verification key. Specifically, as will be described later in specific example 1 below, the i-th (note that i=1, n) element x[i] of the biometric information x is divided so as to satisfy $x[i]=x_1[i]+x_2[i]\cdot x_3[i]$. $\{(x_1[i], x_2[i])\}$ is used as the template, and $\{x_3[i]\}$ is used as the verification key. The sharing processing unit 120 provides the verification key $\{x_3[i]\}$ to the server 200.

Next, in Step S203, the storage unit 130 of the client 100 stores the template $\{(x_1[i], x_2[i])\}$. In Step S204, the storage unit 210 of the server 200 stores the verification key $\{x_3[i]\}$ provided from the client.

Note that the registration processing described above may be repeatedly executed.

As described above, the biometric information x is shared by the client 100 and the server 200 for registration. Therefore, even if a part of the registered information leaks from either the client 100 or the server 200, it is not information enough to allow identification of an individual, and thus personal information is protected.

1.3. Authentication Phase

Figure 3:
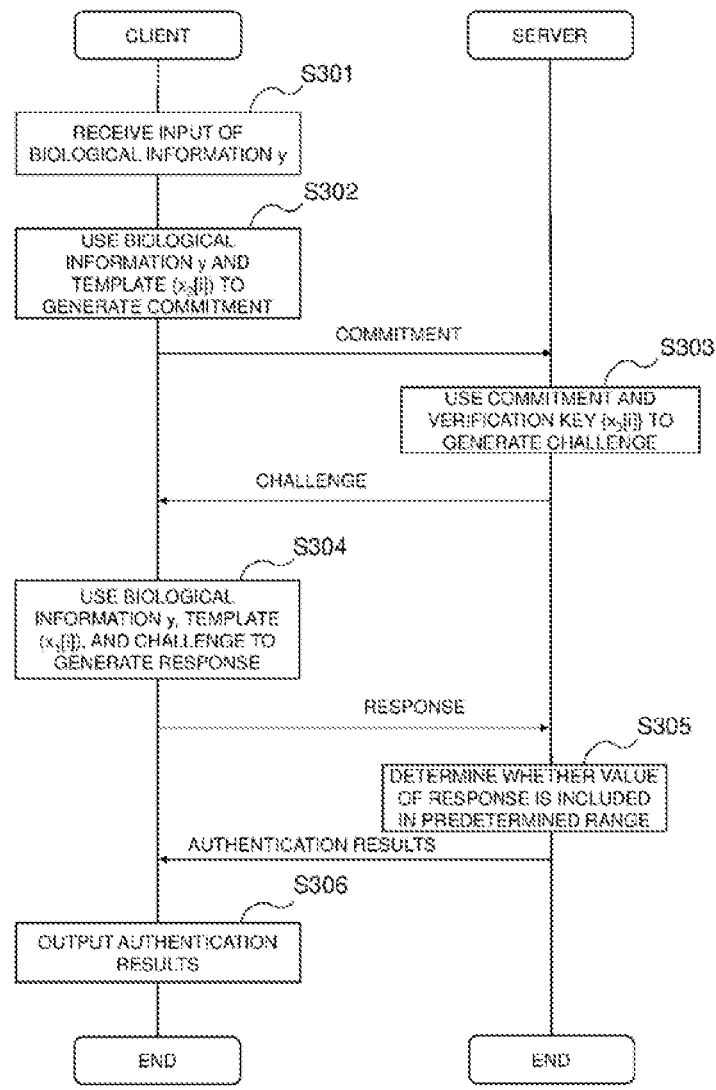
FIG. 3 is a flowchart illustrating an example of a flow of authentication processing according to the first example embodiment.

FIG. 3 is a flowchart illustrating an example of a flow of authentication processing according to the first example embodiment. In the authentication processing, authentication of the person to be authenticated is performed using secure two-party computation between the client 100 and the server 200. Note that a detailed description of what has already been described will be omitted.

First, in Step S301, the collation information input unit 150 of the client 100 receives input of the biometric information y of the person to be authenticated.

Next, in Step S302, the commitment generating unit 160 uses the biometric information y and a part of the template ($x_2[i]$) stored on the storage unit 210 to generate a commitment. The commitment sending unit 165 sends the generated commitment to the server 200.

Next, in Step S303, the challenge generating unit 230 of the server 200 uses the commitment received from the client 100 and the verification key $\{x_3[i]\}$ stored on the storage unit 210 to generate a challenge. The challenge sending unit 235 sends the generated challenge to the client 100.

Next, in Step S304, the response generating unit 170 of the client 100 uses the biometric information y, the part of the template ($x_1[i]$), and the challenge received from the server 200 to generate a response. The response sending unit 175 sends the generated response to the server 200.

Next, in Step S305, the determining unit 240 of the server 200 determines whether a value of the response received from the client 100 is included in a predetermined range. When the value of the response is included in the predetermined range, it is considered that the registered person and the person to be authenticated match, and authentication results indicating "authentication successful" are generated. In contrast, when the value of the response is not included in the predetermined range, it is considered that the registered person and the person to be authenticated do not match, and authentication results indicating "authentication failed" are generated. The determining unit 240 sends the generated authentication results to the client 100.

In Step S306, the output unit 180 of the client 100 outputs the determination results received from the server 200.

Note that the authentication results may be directly output from the server 200. The authentication processing described above may be repeatedly executed.

As described above, the authentication processing of the biometric information y of the person to be authenticated is performed based on the challenge-response method between the client 100 and the server 200. Note that calculation of similarity between the biometric information x of the registered person and the biometric information y of the person to be authenticated performed in the challenge-response method is performed using secure computation using homomorphic encryption. The calculation of similarity will be described in the specific examples to be described below.

The specific examples of the present example embodiment will be described below. In the following description, it is assumed that the biometric information x of the registered person and the biometric information y of the person to be authenticated are common n-dimensional vectors. The similarity between the biometric information x and the biometric information y is calculated using an inner product of the biometric information x and the biometric information y.

1.4. Specific Example 1

FIG. 4 is an explanatory diagram illustrating a specific example of the registration processing according to the present example embodiment.

First, the sharing processing unit 120 of the client 100 calculates $x_1[i]$, $x_2[i]$, and $x_3[i]$ that satisfy $x[i]=x_1[i]+x_2[i]\cdot x_3[i]$ regarding the i-th element x[i] of the input biometric information x of the registered person for each of i=1, . . . , n.

Next, the sharing processing unit 120 stores $\{(x_1[i], x_2[i])\}$ in the storage unit 130 as the template, and provides $\{x_3[i]\}$ to the server 200 as the verification key.

FIG. 5 is an explanatory diagram illustrating a specific example of the authentication processing according to the present example embodiment.

First, the random number generating unit 140 of the client 100 selects a random number $R \in Zp$ at random. Z represents a set of all integers.

Next, the commitment generating unit 160 generates a commitment com=$\{R \cdot x_2[i] \cdot y[i]\}$. The commitment sending unit 165 sends the generated commitment com to the server 200.

Next, the challenge generating unit 230 of the server 200 calculates a value sum=$\Sigma$com[i]$\cdot x_3[i]$. The random number generating unit 220 selects a random number $r1 \in Zp$ at random. Next, the challenge generating unit 230 generates challenges chal1 and chal2 represented by the following expression (1).

[Math. 1]

$$\text{chal1} = g^{rr1}, \text{chal2} = g^{sum}h^r \qquad (1)$$

As represented by expression (1), group operation is performed, not depending on dimensionality of the vectors.

The challenge sending unit 235 sends the generated challenges to the client 100. Note that the value sum is encrypted using homomorphic encryption.

Next, the response generating unit 170 of the client 100 calculates a value sum1=$\Sigma x_1[i] \cdot y[i]$. In addition, the response generating unit 170 uses the calculated value sum1 to generate responses resp1 and resp2 represented by the following expression (2).

[Math. 2]

$$resp1 = chal1^{\frac{1}{R}}, resp2 = g^{sum1} \cdot chal2^{\frac{1}{R}} \qquad (2)$$

As represented by expression (2), group operation is performed, not depending on dimensionality of the vectors.

The response sending unit 175 sends the generated responses to the server 200. Note that the responses resp1 and resp2 are ciphertext of an inner product.

Next, the determining unit 240 of the server 200 determines whether a value represented by (3) below using the responses is included in a predetermined range Dec range.

[Math. 3]

$$resp2/(resp1)^{\frac{sk}{r1}} \qquad (3)$$

When the value is included in the predetermined range Dec range, it is determined that the registered person and the person to be authenticated correspond to each other. In contrast, when the value is not included in the predetermined range Dec range, it is determined that the registered person and the person to be authenticated do not correspond to each other. The determining unit 240 sends the determination results to the client 100.

Note that the inner product x·y for calculating the similarity between the biometric information x and the biometric information y can be calculated using the following expression (4).

[Math. 4]

$$x \cdot y = (x_1 + x_2 \cdot x_3) \cdot y \qquad (4)$$
$$= x_1 \cdot y + x_2 x_3 \cdot y$$

In expression (4), $x_1 \cdot y$ is calculated by the client 100. Thus, information related to $x_1$ is not provided to the server 200. $x_2 x_3 \cdot y$ is calculated using secure computation between the client 100 and the server 200. $x_2$ and $x_3$ are obtained through multiplicative secret sharing of $x_2 \cdot x_3$, and thus calculation results of $x_2 \cdot y$ only need to be multiplied by $x_3$ in the server 200 using secure computation.

In order to perform the addition of $x_1 \cdot y$ while calculation results of $x_2 x_3 \cdot y$ being kept concealed, homomorphic encryption is used. Accordingly, the number of times of encryption does not depend on dimensionality of the vectors, and thus the number of times of group operation in the authentication processing does not depend on the dimensionality either. Therefore, increase of the number of times of group operation along with increase of dimensionality of the vectors can be suppressed, and calculation costs can be reduced.

1.5. Specific Example 2

Next, another specific example different from above specific example 1 will be described. In the present specific example 2, the biometric information y of the person to be authenticated is divided in the authentication processing, which is different from the above specific example 1. The processing related to the commitment, the challenge, and the response is performed on each of the divided parts of the biometric information y. Note that the registration processing is the same as that in above specific example 1, and description thereof will thus be omitted.

FIG. 6 is an explanatory diagram illustrating another specific example of the authentication processing according to the present example embodiment.

First, the collation information input unit 150 of the client 100 calculates $y_1[i]$ and $y_2[i]$ that satisfy $y[i]=y_1[i]+y_2[i]$ regarding the i-th element y[i] of the input biometric information y of the person to be authenticated for each i=1, . . . , n.

Next, the random number generating unit 140 selects two random numbers $R_1$ and $R_2 \in Zp$ at random.

Next, the commitment generating unit 160 generates a commitment com1=$\{R_1 \cdot x_2[i] \cdot y_1[i]\}$ regarding $y_1[i]$, and generates a commitment com2=$\{R_2 \cdot x_2[i] \cdot y_2[i]\}$ regarding $y_2[i]$. The commitment sending unit 165 sends the generated commitments com1 and com2 to the server 200.

Next, the challenge generating unit 230 of the server 200 calculates values sum1=$\Sigma$com1$\cdot x_3[i]$ and sum2=$\Sigma$com2$\cdot x_3[i]$ regarding the two respective commitments. The random number generating unit 220 selects a random number $r1 \in Zp$ at random. Next, the challenge generating unit 230 generates challenges (c11, c12) and (c21, c22) represented by the following expression (5).

[Math. 5]

$$(c11,c12),(c21,c22)=(g^{rr1},g^{sum1}h^r),(g^{rr1},g^{sum2}h^r) \qquad (5)$$

As represented by expression (5), group operation is performed, not depending on dimensionality of the vectors.

The challenge sending unit 235 sends the generated challenges to the client 100.

Next, the response generating unit 170 of the client 100 calculates a value sum=$\Sigma x_1[i] \cdot y[i]$. In addition, the response generating unit 170 uses the calculated value sum to generate responses (resp1, resp2) represented by the following expression (6).

[Math. 6]

$$(resp1, resp2) = \left( c11^{\frac{1}{R_1}} \cdot c21^{\frac{1}{R_2}}, g^{sum} \cdot c12^{\frac{1}{R_1}} \cdot c22^{\frac{1}{R_2}} \right) \quad (6)$$

As represented by expression (6), group operation is performed, not depending on dimensionality of the vectors.

The response sending unit 175 sends the generated responses to the server 200.

Next, the determining unit 240 of the server 200 determines whether a value represented by (7) below using the responses is included in a predetermined range Dec range.

[Math. 7]

$$resp2 \cdot (resp1)^{\frac{sk}{r1}} \quad (7)$$

When the value is included in the predetermined range Dec range, it is determined that the registered person and the person to be authenticated correspond to each other. In contrast, when the value is not included in the predetermined range Dec range, it is determined that the registered person and the person to be authenticated do not correspond to each other. The determining unit 240 sends the determination results to the client 100.

As described above, in the present example embodiment, the authentication processing may be performed, with the collation information y being divided.

1.6. Hardware Configuration

Figure 7:
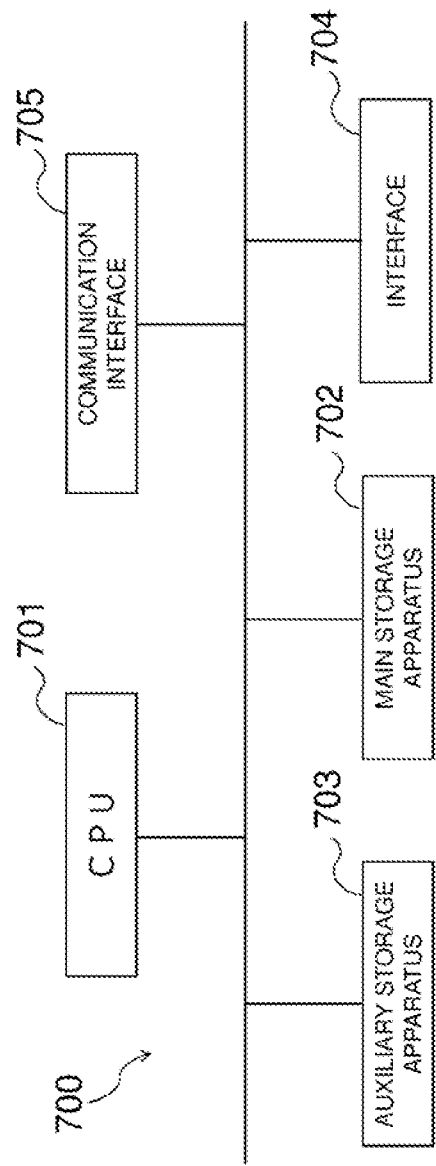
FIG. 7 is a schematic block diagram illustrating a hardware configuration example of a computer related to a client and a server according to the first example embodiment.

FIG. 7 is a schematic block diagram illustrating a hardware configuration example of a computer related to the client and the server according to the present example embodiment. Note that a computer used as the client and a computer used as the server are separate computers.

The computer 700 includes a CPU 701, a main storage apparatus 702, an auxiliary storage apparatus 703, an interface 704, and a communication interface 705.

The client and the server according to the present example embodiment are each implemented by the computer 700. Note that, as described above, a computer used as the client and a computer used as the server are separate computers.

Operation of the computer 700 implementing the client is stored on the auxiliary storage apparatus 703 in the form of a program for the client terminal. The CPU 701 reads the program for the client terminal from the auxiliary storage apparatus 703 and deploys the program for the client terminal in the main storage apparatus 702, and executes the operation of the client described in the present example embodiment in accordance with the program for the client terminal.

Operation of the computer 700 implementing the server is stored on the auxiliary storage apparatus 703 in the form of a program for the server apparatus. The CPU 701 reads the program for the server apparatus from the auxiliary storage apparatus 703 and deploys the program for the server apparatus in the main storage apparatus 702, and executes the operation of the server described in the present example embodiment in accordance with the program for the server apparatus.

The auxiliary storage apparatus 703 is an example of a non-transitory tangible medium. Other examples of the non-transitory tangible medium include a magnetic disk, a magneto-optical disk, a compact disk read only memory (CD-ROM), a digital versatile disk read only memory (DVD-ROM), a semiconductor memory, and the like that are connected via the interface 704. When the program is distributed to the computer 700 via a communication line, the computer 700 that has received the distribution may deploy the program in the main storage apparatus 702, and operate in accordance with the program.

A part or all of the constituent elements of the client may be implemented by a general-purpose or dedicated circuit (circuitry), a processor, or the like, or a combination of these. These may be configured in a single chip, or may be configured with a plurality of chips connected via a bus. A part or all of the constituent elements may be implemented by a combination of the above-described circuit or the like and the program. The same holds true for the server.

1.7. Description of Effects

According to the present example embodiment, the biometric information x of the registered person is secret-shared between the client 100 and the server 200, which may thus enable prevention of leakage of information in a state of allowing identification of individuals.

The collation system 10 according to the present example embodiment performs authentication using the challenge-response method, and thus a value of a response can be changed for each authentication. In other words, even if an attacker wiretaps the value of the response, the wiretapped value can no longer be used in the next authentication. Therefore, identity theft can be prevented.

Similarity calculation between the biometric information x of the registered person and the biometric information y of the person to be authenticated is performed using secure computation using homomorphic encryption, and is performed so that the number of times of encryption does not depend on dimensionality of the vectors. Therefore, the number of times of group operation with large calculation costs does not depend on the dimensionality either, and the calculation costs can be reduced. In other words, calculation time required for similarity calculation can be reduced, and calculation processing can be performed at higher speed.

Note that the predetermined range Dec range may be changed for each user and/or for each client. The predetermined range Dec range may be changed depending on an extrinsic factor or the like. Examples of the extrinsic factor include frequency of authentication received by the server, frequency of suspicious access, a state of a load of the communication network and the CPU, and the like. When the predetermined range Dec range is changed, the load of the communication network and the CPU may be reduced.

Note that a collation system that executes the registration processing out of the processing executed by the collation system 10 may be configured. For example, a collation system for registration may be configured with a client including the registered information input unit 110, the sharing processing unit 120, and the storage unit 130 and a server including the storage unit 210.

Similarly, a collation system that executes the authentication processing out of the processing executed by the collation system 10 may be configured. For example, a collation system for authentication may be configured with a client including the random number generating unit 140, the collation information input unit 150, the commitment generating unit 160, the commitment sending unit 165, the response generating unit 170, the response sending unit 175, and the output unit 180 and a server including the random number generating unit 220, the challenge generating unit 2230, the challenge sending unit 235, and the determining unit 240.

2. Second Example Embodiment

Next, with reference to FIG. 8, a second example embodiment of the present invention will be described. The above-described first example embodiment is a concrete example embodiment, whereas the second example embodiment is a more generalized example embodiment.

2.1. System Configuration

Figure 8:
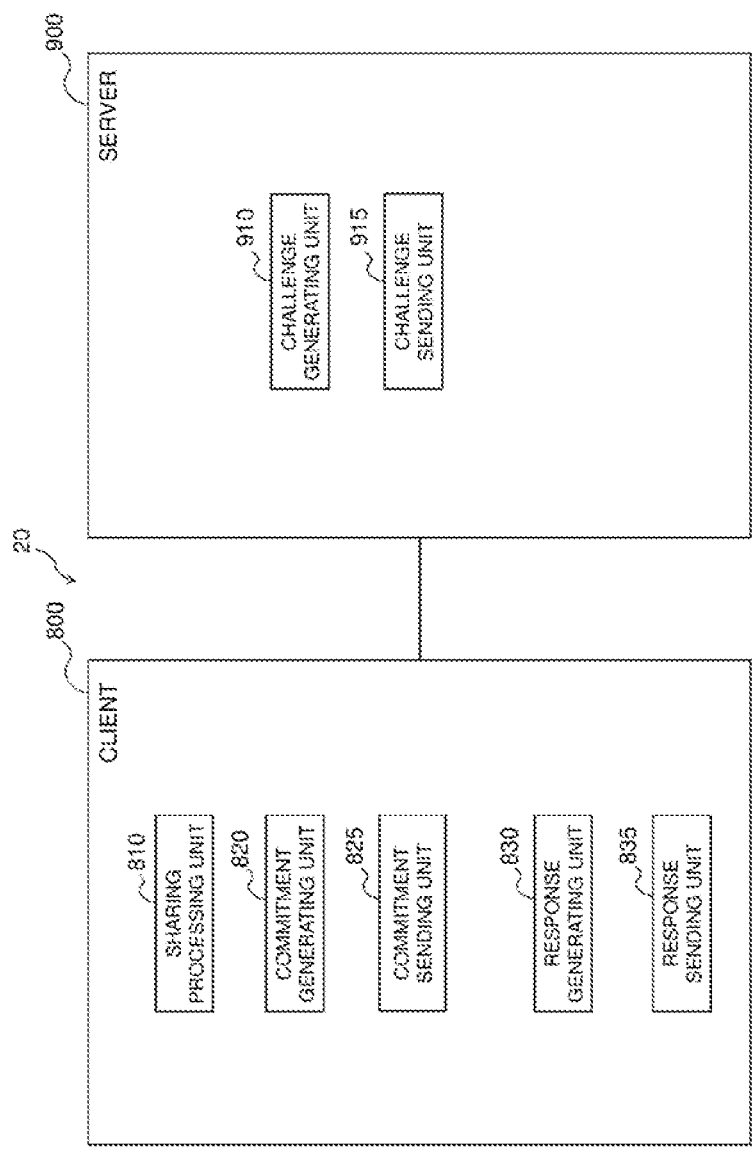
FIG. 8 is a block diagram illustrating a configuration example of a collation system according to a second example embodiment.

FIG. 8 is a block diagram illustrating a configuration example of a collation system according to the second example embodiment. A collation system 20 according to the present example embodiment includes a client 800 and a server 900. Note that, although a single client 800 is illustrated, a plurality of clients 800 may be present. The client 800 and the server 900 can communicate with each other via a communication network.

The client 800 includes a sharing processing unit 810, a commitment generating unit 820, a commitment sending unit 825, a response generating unit 830, and a response sending unit 835. The server 900 includes a challenge generating unit 910 and a challenge sending unit 915. Specific operations of each constituent element will be described later.

Regarding the client 800, the sharing processing unit 810, the commitment generating unit 820, the commitment sending unit 825, the response generating unit 830, and the response sending unit 835 are, for example, implemented by a central processing unit (CPU) of a computer that operates in accordance with a program for the client terminal and a communication interface of the computer. For example, the CPU may read a program for the client terminal from a program recording medium of the computer, such as a program storage apparatus, and operate as the commitment generating unit 820, the commitment sending unit 825, the response generating unit 830, and the response sending unit 835 with the use of the communication interface in accordance with the program.

Regarding the server 900, the challenge generating unit 910 and the challenge sending unit 915 are, for example, implemented by a CPU of a computer that operates in accordance with a program for the server apparatus and a communication interface of the computer. For example, the CPU may read the program for the server apparatus from a program recording medium of the computer, such as a program storage apparatus, and operate as the challenge generating unit 230, the challenge sending unit 235, and the determining unit 240 with the use of the communication interface in accordance with the program.

2.2. Registration Phase

An operation example of the registration phase according to the second example embodiment will be described.

The sharing processing unit 810 of the client 800 divides registered information into first information and second information, and provides the second information to the server 900. In other words, the sharing processing unit 810 functions as a secret sharing processing unit.

2.3. Authentication Phase

An operation example of the authentication phase according to the second example embodiment will be described.

The commitment generating unit 820 of the client 800 executes, based on collation information input for collation with the registered information, and the first information, a first step for similarity calculation between the registered information and the collation information. In other words, the commitment generating unit 820 functions as a first similarity calculating unit that executes first similarity calculating processing.

The commitment sending unit 825 sends calculation results of the first step to the server 900. In other words, the commitment sending unit 825 functions as a first sending unit.

The challenge generating unit 910 of the server 900 executes a second step for the similarity calculation, based on the calculation results of the first step received from the client 800 and the second information. In other words, the challenge generating unit 910 functions as a second similarity calculating unit that executes second similarity calculating processing.

The challenge sending unit 915 sends calculation results of the second step to the client 800. In other words, the challenge sending unit 915 functions as a second sending unit.

The response generating unit 830 of the client 800 executes a third step for the similarity calculation based on the calculation results of the second step received from the server 900 and the first information, and calculates the similarity between the registered information and the collation information. In other words, the response generating unit 830 functions as a third similarity calculating unit that executes third similarity calculating processing.

Relationship with First Example Embodiment

As an example, the client 800 and the server 900 according to the second example embodiment correspond to the client 100 and the server 200 according to the first example embodiment, respectively. In this case, the descriptions of the first example embodiment may be applied to the second example embodiment as well.

Note that the second example embodiment is not limited to this example.

2.4. Description of Effects

According to the second example embodiment, leakage of registered information and identity theft can be prevented, and calculation costs for collating registered information of a registered person and collation information of a person to be authenticated can be reduced.

3. Other Example Embodiments

Note that the present invention is not limited to the example embodiments described above. It should be understood by those of ordinary skill in the art that the example embodiments described above are merely examples and that various alterations are possible without departing from the scope and the spirit of the present invention.

For example, the steps in the processing described in the Specification may not necessarily be executed in time series in the order described in the corresponding flowchart. For example, the steps in the processing may be executed in an order different from that described in the corresponding flowchart or may be executed in parallel. Some of the steps in the processing may be deleted, or more steps may be added to the processing.

An apparatus including constituent elements of the collation system described in the Specification (e.g., one or more apparatuses (or units) among a plurality of apparatuses (or units) constituting the collation system or a module for one of the plurality of apparatuses (or units)) may be provided. Moreover, methods including processing of the constituent elements may be provided, and programs for causing a processor to execute processing of the constituent elements may be provided. Moreover, non-transitory computer readable recording media (non-transitory computer readable media) having recorded thereon the programs may be provided. It is apparent that such apparatuses, modules, methods, programs, and non-transitory computer readable recording media are also included in the present invention.

Some of or all the above-described example embodiments can be described as in the following Supplementary Notes, but are not limited to the following.

[Supplementary Note 1]

A collation system including a client terminal and a server apparatus, the collation system including:
  a secret sharing processing unit in the client terminal configured to divide registered information to first information and second information, and to provide the second information to the server apparatus;
  a first similarity calculating unit in the client terminal configured to perform a first step for similarity calculation between the registered information and collation information inputted for collation with the registered information, based on the collation information and the first information;
  a first sending unit in the client terminal configured to send a calculation result of the first step to the server apparatus;
  a second similarity calculating unit in the server apparatus configured to perform a second step for the similarity calculation based on the calculation result of the first step received from the client terminal, and the second information;
  a second sending unit in the server apparatus configured to send a calculation result of the second step to the client terminal; and
  a third similarity calculating unit in the client terminal configured to perform a third step for the similarity calculation based on the calculation result of the second step received from the server apparatus, and the first information to calculate the similarity between the registered information and the collation information.

[Supplementary Note 2]

The collation system according to supplementary note 1, wherein
  when the registered information is x, the first information is $x_1$, $x_2$, and the second information is $x_3$, the registered information is divided to satisfy $x = x_1 + x_2 \cdot x_3$.

[Supplementary Note 3]

The collation system according to supplementary note 2, wherein
  the similarity calculation is an inner product calculation of the registered information and the collation information, represented by $x \cdot y = (x_1 + x_2 \cdot x_3) \cdot y$ when the collation information is y,
  in the first step, $x_2 \cdot y$ is calculated,
  in the second step, the calculation result of the first step is multiplied by $x_3$, and
  in the third step, $x_1 \cdot y$ is added to the calculation results of the second step.

[Supplementary Note 4]

The collation system according to supplementary note 3, wherein
  the collation information is divided to satisfy $y = y_1 + y_2$, and
  the first step, the second step and the third step are performed for each of $y_1$ and $y_2$.

[Supplementary Note 5]

The collation system according to any one of supplementary notes 1 to 4, wherein
  the second step and the third step are performed in secure computation.

[Supplementary Note 6]

The collation system according to any one of supplementary notes 1 to 5, wherein
  the registered information and the collation information are common n-dimensional vectors.

[Supplementary Note 7]

The collation system according to any one of supplementary notes 1 to 6, wherein
  the client terminal and the server apparatus perform the similarity calculation based on a challenge-response method.

[Supplementary Note 8]

The collation system according to any one of supplementary notes 1 to 6, wherein
  the registered information and the collation information represent a feature of biometric information.

[Supplementary Note 9]

A client terminal including:
  a secret sharing processing unit configured to divide registered information to first information and second information, to store the first information, and to provide the second information to a server apparatus;
  a first similarity calculating unit configured to perform a first step for similarity calculation between the registered information and collation information inputted for collation with the registered information, based on the collation information and the first information;
  a sending unit configured to send a calculation result of the first step to the server apparatus; and
  a third similarity calculating unit configured to perform a third step for the similarity calculation based on a calculation result of a second step for the similarity calculation based on a calculation result of the first step received from the server apparatus and the second information, and the first information to calculate the similarity between the registered information and the collation information.

[Supplementary Note 10]

A server apparatus including:
  a second similarity calculating unit configured to receive, from a client terminal, a calculation result of a first step for similarity calculation between first information divided from registered information and collation information inputted for collation with the registered information, and to perform a second step for the similarity calculation based on the calculation result of the first step and second information divided from the registered information; and
  a sending unit configure to send, to the client terminal, a calculation result of the second step for the client terminal to perform a third step for the similarity calculation based on the calculation result of the second step and the first information.

[Supplementary Note 11]

A collation method in a collation system including a client terminal and a server apparatus, the collation method including:

dividing, by the client terminal, registered information to first information and second information;

providing, by the client terminal, the second information to the server apparatus;

performing, by the client terminal, a first step for similarity calculation between the registered information and collation information inputted for collation with the registered information, based on the collation information and the first information;

sending, by the client terminal, a calculation result of the first step to the server apparatus;

performing, by the server apparatus, a second step for the similarity calculation based on the calculation result of the first step received from the client terminal, and the second information;

sending, by the server apparatus, a calculation result of the second step to the client terminal; and performing, by the client terminal, a third step for the similarity calculation based on the calculation result of the second step received from the server apparatus, and the first information to calculate similarity between the registered information and the collation information.

[Supplementary Note 12]

A program for a client terminal causing a computer to execute:

a secret sharing process of dividing registered information to first information and second information, storing the first information, and providing the second information to a server apparatus;

a first similarity calculating process of performing a first step for similarity calculation between the registered information and collation information inputted for collation with the registered information, based on the collation information and the first information;

a sending process of sending a calculation result of the first step to the server apparatus; and a third similarity calculating process of performing a third step for the similarity calculation based on a calculation result of a second step for the similarity calculation based on a calculation result of the first step received from the server apparatus and the second information, and the first information to calculate the similarity between the registered information and the collation information.

[Supplementary Note 13]

A program for a server apparatus causing a computer to execute:

a second similarity calculating process of receiving, from a client terminal, a calculation result of a first step for similarity calculation between first information divided from registered information and collation information inputted for collation with the registered information, and performing a second step for the similarity calculation based on the calculation result of the first step and second information divided from the registered information; and a sending process of sending, to the client terminal, a calculation result of the second step for the client terminal to perform a third step for the similarity calculation based on the calculation result of the second step and the first information.

INDUSTRIAL APPLICABILITY

The present invention is suitably applied to a collation system that performs authentication using a client and a server.

REFERENCE SIGNS LIST

10 Collation System
100 Client
110 Registered Information Input Unit
120 Sharing Processing Unit
130 Storage Unit
140 Random Number Generating Unit
150 Collation Information Input Unit
160 Commitment Generating Unit
165 Commitment Sending Unit
170 Response Generating Unit
175 Response Sending Unit
180 Output Unit
200 Server
210 Storage Unit
220 Random Number Generating Unit
230 Challenge Generating Unit
235 Challenge Sending Unit
240 Determining Unit

What is claimed is:

1. A collation system comprising:

a client terminal including a memory storing instructions, and one or more processors; and a server apparatus including a memory storing instructions, and one or more processors, wherein the client terminal is configured to divide registered information to first information and second information, and to provide the second information to the server apparatus, the client terminal is configured to perform a first step for similarity calculation between the registered information and collation information inputted for collation with the registered information, based on the collation information and the first information, the client terminal is configured to send a calculation result of the first step to the server apparatus, the server apparatus is configured to perform a second step for the similarity calculation based on the calculation result of the first step received from the client terminal, and the second information, the server apparatus is configured to send a calculation result of the second step to the client terminal, and the client terminal is configured to perform a third step for the similarity calculation based on the calculation result of the second step received from the server apparatus, and the first information to calculate similarity between the registered information and the collation information.

2. The collation system according to claim 1, wherein the registered information is x, the first information is $x_1$, $x_2$, and the second information is $x_3$, the registered information is divided to satisfy $x=x_1+x_2 \cdot x_3$.

3. The collation system according to claim 2, wherein the similarity calculation is an inner product calculation of the registered information and the collation information, represented by $x \cdot y=(x_1+x_2 \cdot x_3) \cdot y$ when the collation information is y, in the first step, $x_2 \cdot y$ is calculated, in the second step, the calculation result of the first step is multiplied by $x_3$, and in the third step, $x_1 \cdot y$ is added to the calculation results of the second step.

4. The collation system according to claim 3, wherein the collation information is divided to satisfy $y=y_1+y_2$, and
the first step, the second step and the third step are performed for each of $y_1$ and $y_2$.

5. The collation system according to claim 1, wherein the second step and the third step are performed in secure computation.

6. The collation system according to claim 1, wherein the registered information and the collation information are common n-dimensional vectors.

7. The collation system according to claim 1, wherein the client terminal and the server apparatus are configured to perform the similarity calculation based on a challenge-response method.

8. The collation system according to claim 1, wherein the registered information and the collation information represent a feature of biometric information.

9. A client terminal comprising:
a memory storing instructions; and
one or more processors configured to execute the instructions to:
 divide registered information to first information and second information, to store the first information, and to provide the second information to a server apparatus;
 perform a first step for similarity calculation between the registered information and collation information inputted for collation with the registered information, based on the collation information and the first information;
 send a calculation result of the first step to the server apparatus; and
 perform a third step for the similarity calculation based on a calculation result of a second step for the similarity calculation based on a calculation result of the first step received from the server apparatus and the second information, and the first information to calculate similarity between the registered information and the collation information.

10. A server apparatus comprising:
a memory storing instructions; and
one or more processors configured to execute the instructions to:
 receive, from a client terminal, a calculation result of a first step for similarity calculation between first information divided from registered information and collation information inputted for collation with the registered information, and to perform a second step for the similarity calculation based on the calculation result of the first step and second information divided from the registered information; and
 send, to the client terminal, a calculation result of the second step for the client terminal to perform a third step for the similarity calculation based on the calculation result of the second step and the first information.

11. A collation method in a collation system including a client terminal and a server apparatus, the collation method comprising:
 dividing, by the client terminal, registered information to first information and second information;
 providing, by the client terminal, the second information to the server apparatus;
 performing, by the client terminal, a first step for similarity calculation between the registered information and collation information inputted for collation with the registered information, based on the collation information and the first information;
 sending, by the client terminal, a calculation result of the first step to the server apparatus;
 performing, by the server apparatus, a second step for the similarity calculation based on the calculation result of the first step received from the client terminal, and the second information;
 sending, by the server apparatus, a calculation result of the second step to the client terminal; and
 performing, by the client terminal, a third step for the similarity calculation based on the calculation result of the second step received from the server apparatus, and the first information to calculate similarity between the registered information and the collation information.

* * * * *